United States Patent [19]

Croteau

[11] Patent Number: 4,559,140

[45] Date of Patent: Dec. 17, 1985

[54] PAINT FILTER

[75] Inventor: Rene Croteau, Contrecoeur, Canada

[73] Assignee: Centre de Recherche Industrielle du Quebec, Quebec, Canada

[21] Appl. No.: 595,409

[22] Filed: Mar. 30, 1984

[51] Int. Cl.[4] .............................................. B01D 35/28

[52] U.S. Cl. ............................... 210/497.2; 210/497.3

[58] Field of Search ........................... 210/497.2, 497.3

[56] References Cited

U.S. PATENT DOCUMENTS

| | | | |
|---|---|---|---|
| 752,019 | 2/1904 | Adwen | 210/497.2 |
| 3,738,889 | 6/1973 | Whelan | 210/497.2 |
| 4,064,053 | 12/1977 | Gerson | 210/497.2 |

*Primary Examiner*—John Adee

*Attorney, Agent, or Firm*—Oblon, Fisher, Spivak, McClelland & Maier

[57] ABSTRACT

The present invention relates to a paint strainer, its blank and the method of making same. The strainer comprises a conical receptacle having a conically tapering side wall formed of stiff sheet material and defining an upper support portion having an open end, and a lower filtration portion. The lower filtration portion has a first reinforcing arm formed integral with the upper support portion and terminating at a pointed free end located at the apex of the receptacle. A second reinforcing arm is formed integral with the upper support portion and disposed substantially diametrically opposed to the first reinforcing arm. The second reinforcing arm is connected adjacent to the pointed free end of the first reinforcing arm and defines a lower filtration aperture and further side filtration apertures to each side of the first and second reinforcing arms. A filtration mesh screen is disposed over the filtration apertures. The first reinforcing arm provides stress distribution and rigidity to the screen in the lower filtration apertures.

7 Claims, 5 Drawing Figures

PAINT FILTER

BACKGROUND OF THE INVENTION a. Field of the Invention

The present invention relates to an improved paint strainer, its blank and method of making same and particularly to a strainer having a reinforced lower filtration aperture.

b. Description of Prior Art

Various paint strainers are known, such as described in U.S. Pat. No. 4,158,631 issued on June 19, 1979. However, many such strainers provide obstruction in the lower filtration aperture by either providing excessive strengthening therein or by folding the filtration mesh material to reinforce same in that area. Often, when filtering liquids, such as paint, lumps of paint will lodge themselves against these reinforcing arms and obstruct the usually small lower filtration aperture, thus impairing the proper functioning of the filter. Also, the provision of joints in the area of the filtration apertures causes paint to seep between these joints, thus deteriorating the filter or providing improper filtration of the liquids. Still further, the configuration of many of such filters do not provide sufficient filtration aperture areas and thus renders the filtration process time consuming and often causing overloading of the filter and thus applying excess stress against the support areas of the filter often resulting in detachment thereof causing spillage or having to repeat the filtration process.

SUMMARY OF THE INVENTION

It is a feature of the present invention to provide an improved paint strainer, blank and method of making same which substantially overcomes all of the above mentioned disadvantages.

According to the above features, from a broad aspect, the present invention provides a paint strainer comprising a conical receptacle having a conically tapering side wall formed of stiff sheet material and defining an upper support portion having an open end, and a lower filtration portion. The lower filtration portion has a first reinforcing arm formed integral with the upper support portion and terminating at a pointed free end located at the apex of the receptacle. A second reinforcing arm is formed integral with the upper support portion and disposed substantially diametrically opposed to the first reinforcing arm. The second reinforcing arm is connected adjacent the pointed free end of the first reinforcing arm and defines a lower filtration aperture and further side filtration apertures to each side of the first and second reinforcing arms. A filtration mesh screen is disposed over the filtration apertures, the first reinforcing arm provides stress distribution and rigidity to the screen in the lower filtration aperture with minimum obstruction to the filtration portion of the strainer.

According to a further broad aspect of the present invention there is provided a paint strainer blank comprising a flat sheet having opposed side edges and opposed symmetrical end edges and configured to be folded into a conical shape strainer. A first one of the side edges has a convex shape in a major central portion thereof. A second one of the side edges is of concave shape in a major central portion and has a V-shape cut-out centrally disposed therein. A small pointed arm protrudes into the V-shape opening adjacent the concave side edge and terminates at its apex on the central transverse axis of the blank. Two large symmetrical apertures are cut-out on a respective side of the V-shape opening and spaced inwardly of the concave side edge. A one-piece filtration mesh screen is secured to the blank and overlies the two large apertures and a substantial portion of the V-shape opening.

According to a still further broad aspect of the present invention there is provided a method of making a cone shape paint strainer. The method comprises the steps of providing a roll of stiff sheet material. A paint strainer blank is cut at precise spaced intervals along the sheet material. The blank has opposed side edges and opposed symmetrical end edges and configured to be folded into a conical shape strainer. A first one of the side edges has a convex shape, in a major central portion thereof. A second one of the side edges is concave shape in a major central portion and has a V-shape cut-out centrally disposed therein. A small pointed arm protrudes into the V-shape opening adjacent the concave side edge and terminates at its apex on the central transverse axis of the blank. Two large symmetrical apertures are cut-out on a respective side of the V-shape opening and spaced inwardly of the concave side edge. Glue is applied to predetermined locations on the blank. A one-piece filtration mesh screen is applied over the two large apertures and a substantial portion of the V-shape opening. The blank is then detached with the glued-on mesh screen and folded into a cone shaped strainer.

BRIEF DESCRIPTION OF DRAWINGS

A preferred embodiment of the present invention will now be described with reference to an example thereof as illustrated in the accompanying drawings, in which.

DESCRIPTION OF PREFERRED EMBODIMENTS

Figure 1:
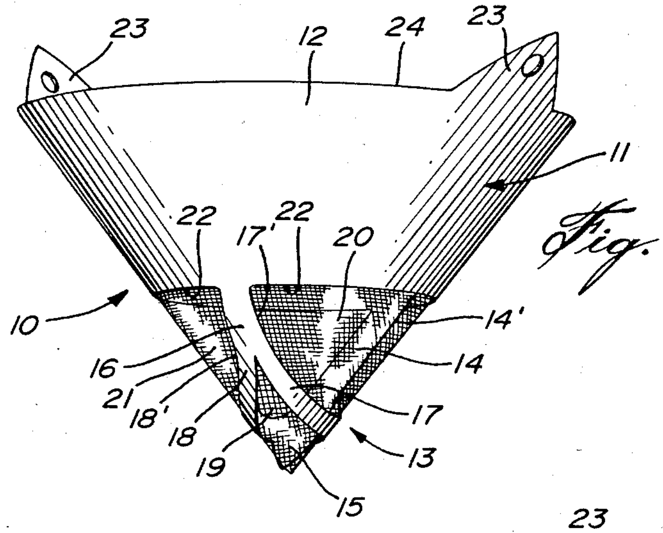
FIG. 1 is a perspective view of the cone shaped paint strainer of the present invention.
Figure 2:
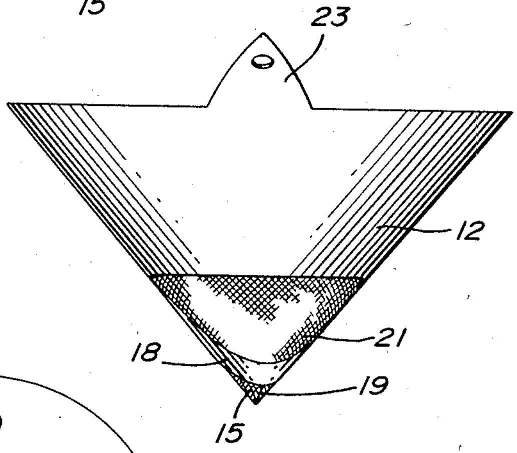
FIG. 2 is a side view of the paint strainer showing the position of the reinforcing arms and apertures.
Figure 3:
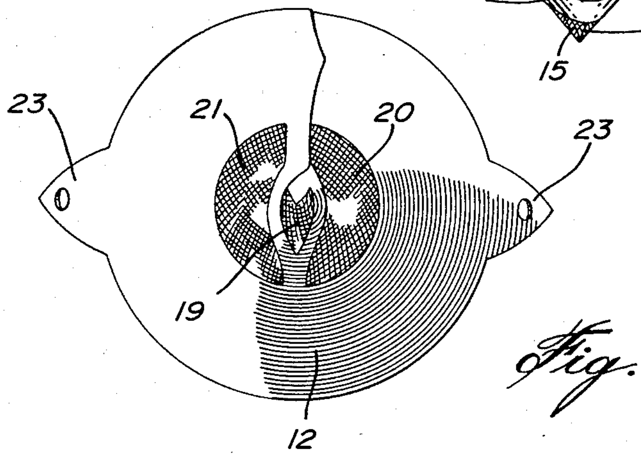
FIG. 3 is a top view of the conical paint strainer.

Referring now to the drawings, more particularly to FIGS. 1 to 3, there is shown generally at 10 the cone shape paint strainer of the present invention. The strainer is shaped as an open top end cone receptacle having a conically tapering side wall 11 formed of stiff sheet material and defining an upper support portion 12 and a lower filtration portion 13. The lower filtration portion 13 has a first reinforcing arm 14 formed integral with the upper support portion 12 and terminating at a pointed free end 15 at the apex 20 of the receptacle. This arm 14 is of double-ply as will be described later.

A second reinforcing arm 16 is also formed integral with the upper support portion 12 and is disposed substantially diametrically opposed to the first reinforcing arm 14. The second reinforcing arm is provided with two angulated leg portions 17 and 18, both of which are secured at a free end thereof to the first reinforcing arm 14, by suitable means such as glue or fasteners (not shown) to provide maximum strenghtening with minimum obstruction by the arms thus resulting in enlarged filtration apertures.

A lower filtration aperture 19 is defined between the two angulated leg portions 17 and 18 and extends to the apex 20 of the first arm 14. Further side filtration apertures 20 and 21 are provided on each side of the second reinforcing arm and defined between the outer edges 17' and 18' of the second arm, the lower edge 22 of the upper support portion 12 and the side edges 14' and 14'' of the first reinforcing arm 14.

A filtration mesh screen is herein shown secured inwardly of the conically tapering side wall 11 and extending across the filtration apertures 19, 20 and 21.

As can be seen from these drawings, substantially large filtration apertures are provided and reinforced with minimum obstruction by the two reinforcing arms 14 and 18. Furthermore, the arm 14 has a pointed free end 15 which extends at its point to the apex 20 whereby adding stiffness and rigidity to the screen in the lower filtration aperture 19 where there is maximum impact when a liquid is poured in the filter. Also, the end 15 directs the fluid against the mesh of the lower filtration aperture 19. The first support arm 14 is further solidified by the two wrap-around leg portions 17 and 18 and distributes the load across the upper support portion 12.

In order to support the conical filter over a receptacle, such as a paint can, (not shown), there is provided diametrically opposed perforated ears 23 formed integral with the top edge 24 of the upper portion 12. Such ears are securable in the wire-like handle portion of paint cans (not shown) whereby the filter can be retained over the opening of the can.

Figure 4:
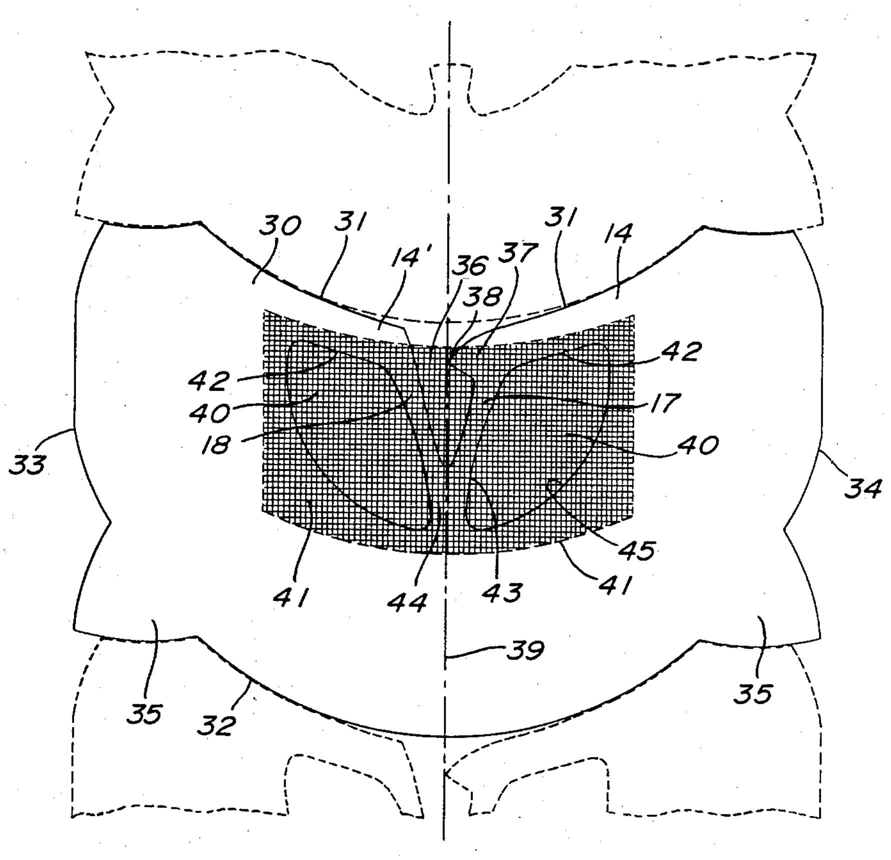
FIG. 4 is a plan view of the blank.

Referring now to FIG. 4, there is shown the blank 30 which forms the conical paint strainer 10 of the present invention. As herein shown, the blank 30 comprises a flat sheet of stiff material, such as rigid paper, and is defined by opposed side edges 31 and 32 and opposed symmetrical end edges 33 and 34. The edges are configured whereby the blank 30 is folded into a conical shape strainer as shown in FIGS. 1 to 3.

The first one of the side edges, namely edge 32, has a convex shape in a major central portion thereof and merges in a lower corner portion of the end edges 33 to form a perforated ear 35 which is of substantially triangular shape. The second one of the side edges, namely edge 31, is of concave shape having its curvature extending substantially parallel to the convex shape curvature of the first side edge 32. A V-shape cut-out 36 is centrally disposed in the second side edge 31. A small pointed arm 37 protrudes into the V-shape opening 36 and merges into the concave side edge 31 and terminates at its apex 38 on the central transverse axis 39 of the blank 30.

Two large symmetrical apertures 40 are cut-out on a respective side of the V-shape opening 36 and spaced inwardly of the concave side edge 31. A filtration mesh screen 41 is secured on the face of the blank 30 and overlies the two large apertures 40 and a substantial portion of the V-shape opening 36 and at least covering the apex 38 of the arm 37.

Each of the two large symmetrical apertures 40 has a first edge 42 disposed substantially parallel to the side edge 31. A second outwardly curved edge 43 merges towards the central transverse axis 39 and spaced inwardly thereof whereby to define between the apertures 40 a fork-shaped arm 44 therebetween constituting the reinforcing arm 16. A third curve edge 45 is outwardly disposed and bridges the extremeties of the first and second edges 40 and 43, respectively. Thus, there is formed apertures 40 of substantially triangular configuration as shown in FIG. 1.

The first reinforcing arm 14 is defined between the edge 31 and the first edge 42 of the large aperture 40 on the side of the blank containing the small pointed arm 37. A reinforcing support arm portion 14' is formed between the edge 42 of the other large aperture and the concave edge 31 and is adapted to be juxtaposed with the arm 14 to form a double-ply reinforcement when the blank is folded into a conical shape strainer.

Figure 5:
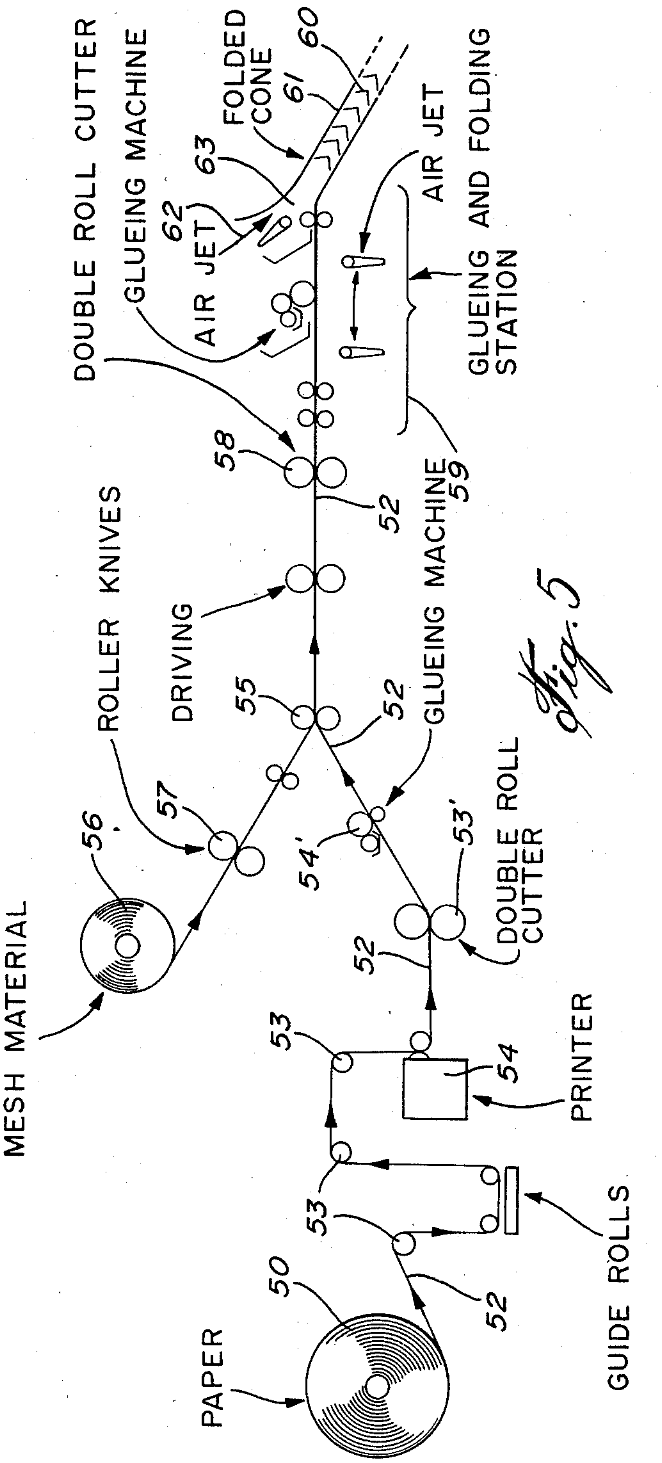
FIG. 5 is a schematic view illustrating the method of making the cone shape paint strainer of the present invention.

Referring now to FIG. 5, there is shown a method of making the cone shape paint strainer 10 of the present invention. The method comprises providing a roll 50 of stiff paper sheet material. The paper web 52 is guided through a plurality of guide rolls 53 to a printer 54 where any desired markings may be printed on the filter. The paper web 52 then exits the printer and is fed a double roll cutter 53' where the blank is cut into the paper with necessary support lines (not shown) whereby to maintain the cut-out portion on the web sheet.

At the exit of the double roll cutter 53, the web is directed to a glueing machine 54' where glue is applied to a surface of the blank on which there is to be received the filtration mesh screen 41, as shown in FIG. 4. The web 52 is then directed to a pair of rollers 55 where the filtration mesh screens 41 are applied. The mesh screen 41 may be supplied from a roll 56 of mesh material which is fed through a pair of roller knives 57 and then entrained to the double roll applicators 55.

The web 52 and the mesh screen 41 supported thereon is then fed to a further double roll cutter 58 where the blank is completely cut from the web 52. The blank is then directed to a further glueing and folding station 59 where the blank is folded into a cone with the arms 14 and 14' glued in juxtaposition. The folded cones 60 are then directed into a conveyor 61 wherein the cones are disposed in nesting relationship. The conveying can be effected by directing an air jet in the direction of arrow 62 in the trough 63 of the conveyor 61.

It is within the ambit of the present invention to cover any obvious modifications of the example of the preferred embodiment described herein, provided such modifications fall within the scope of the appended claims.

I claim:

1. A paint strainer comprising a conical receptacle having a conically tapering side wall formed of stiff sheet material and defining an upper support portion having an open end and a lower filtration portion, said lower filtration portion having a first reinforcing arm formed integral with said upper support portion and terminating at a pointed free end located at the apex of said receptacle, a second reinforcing arm is formed integral with said upper support portion and disposed substantially diametrically opposed to said first reinforcing arm, said second reinforcing arm being connected adjacent said pointed free end of said first reinforcing arm and defining a lower filtration aperture substantially unobstructed at its apex and further side filtration apertures to each side of first and second reinforcing arms and a filtration mesh screen disposed over said filtration apertures as a single-ply screen, said mesh screen being joint-free in the area of said filtration apertures, said first reinforcing arm providing stress distribution and rigidity to said screen in said lower filtration aperture with minimum obstruction to the apex of said filtration aperture of said receptacle to prevent accumulation of paint and obstruction to said mesh screen.

2. A paint strainer as claimed in claim 1 wherein said second reinforcing arm is provided with two angulated leg portions both of which are secured at a free end thereof to said first reinforcing arm and define therebetween said lower filtration aperture, said first reinforcing arm having a double-ply of said stiff sheet material.

3. A paint strainer as claimed in claim 2 wherein one of said leg portions is formed integral and bridges said upper support portion and said first support arm.

4. A paint strainer blank comprising a flat sheet having opposed side edges and opposed symmetrical end edges and configured to be folded into a conical shape strainer, a first one of said side edges having a convex shape in a major central portion thereof, a second one of said side edges being concave shape in an aligned major central portion, a V-shape cut-out centrally disposed in said second side edge, a small pointed arm protruding into said V-shape opening adjacent said concave side edge and terminating at its apex on the central transverse axis of said blank, and two large symmetrical apertures cut-out on a respective side of said V-shape opening and spaced inwardly of said concave side edge, and a one-piece filtration mesh screen secured to said blank and overlying said two large apertures and a substantial portion of said V-shape opening.

5. A paint strainer blank as claimed in claim 4 wherein said opposed end edges are provided with a perforated ear formed at its intersection with said first one of said side edges.

6. A paint strainer blank as claimed in claim 5 wherein each said two large symmetrical apertures has a first edge disposed substantially parallel to said second side edge, a second outwardly curved edge merging toward said central transverse axis and spaced inwardly thereof to define a fork-shaped arm between said two large apertures, and a third curved edge outwardly curved edge bridging the extremeties of said first and second edges.

7. A paint strainer as claimed in claim 4 wherein a support arm is defined between said concave second edge and said first edge of said large apertures and adapted to be juxtaposed when said blank is folded into a conical shape strainer.

* * * * *

UNITED STATES PATENT AND TRADEMARK OFFICE

CERTIFICATE OF CORRECTION

PATENT NO. : 4,559,140

DATED : December 17, 1985

INVENTOR(S) : Croteau, Rene

It is certified that error appears in the above-identified patent and that said Letters Patent is hereby corrected as shown below: On the title page;

--The Assignee in this Letters Patent is incorrect. The Assignee should be as follows:

CANIMPORT LTEE --

Signed and Sealed this

*First* Day of *April 1986*

[SEAL]

*Attest:*

DONALD J. QUIGG

*Attesting Officer*

*Commissioner of Patents and Trademarks*